Jan. 24, 1933.  B. F. FITCH  1,894,950
APPARATUS FOR TRANSFERRING FREIGHT
Filed Oct. 23, 1929  4 Sheets-Sheet 1
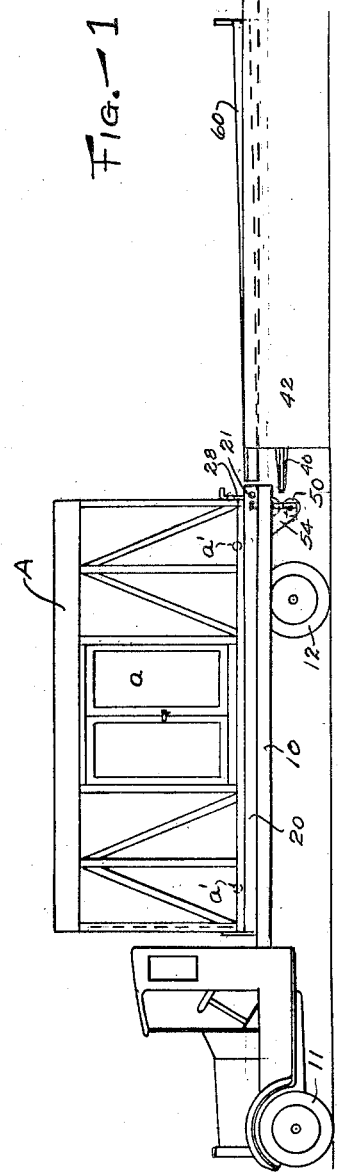
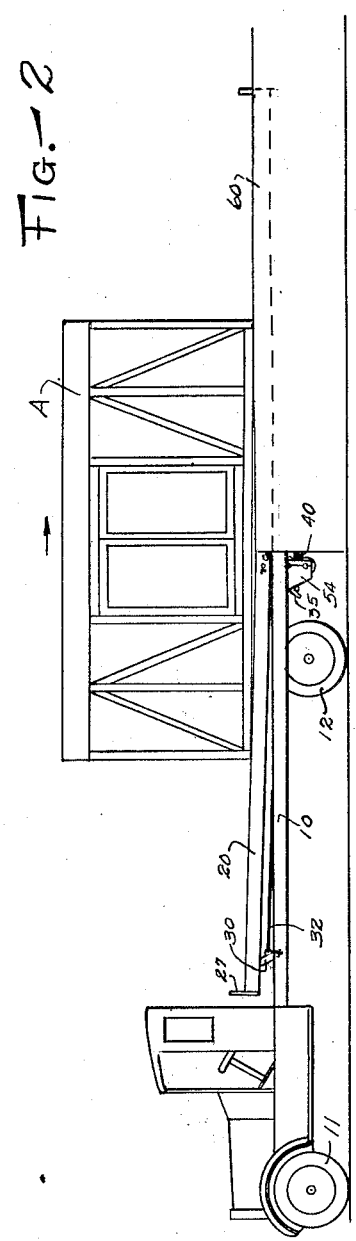
Inventor
Benjamin F. Fitch,
By Bakis, Golrick & Hearn
Attorneys Jan. 24, 1933.        B. F. FITCH        1,894,950
APPARATUS FOR TRANSFERRING FREIGHT
Filed Oct. 23, 1929       4 Sheets-Sheet 2
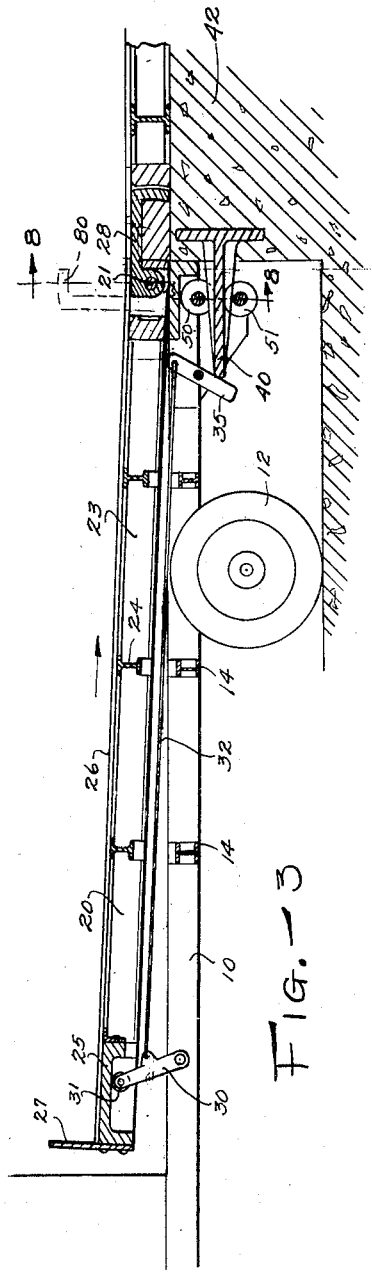
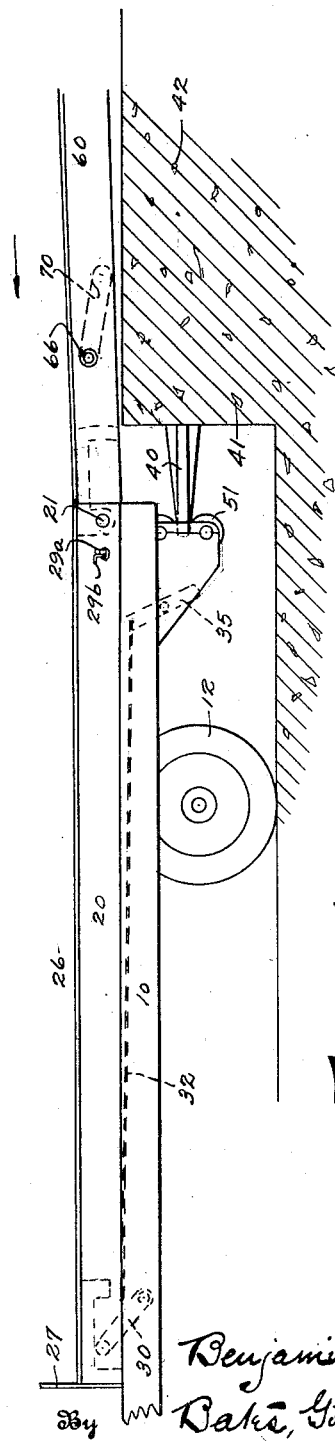
Inventor
Benjamin F. Fitch,
By Baker, Golrick & Sears,
Attorneys Jan. 24, 1933.  B. F. FITCH  1,894,950
APPARATUS FOR TRANSFERRING FREIGHT
Filed Oct. 23, 1929  4 Sheets-Sheet 3
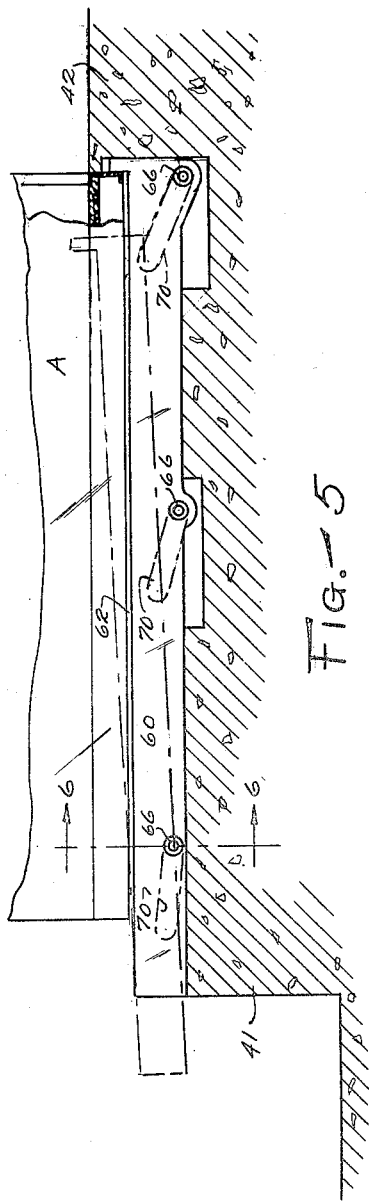
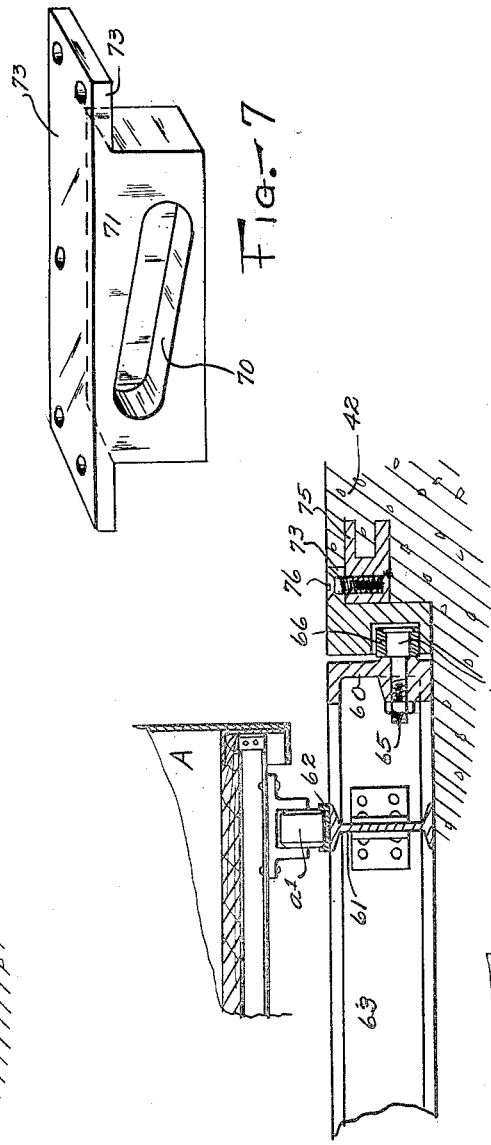
Inventor
Benjamin F Fitch,
By Bates, Goldrick Neary
Attorneys

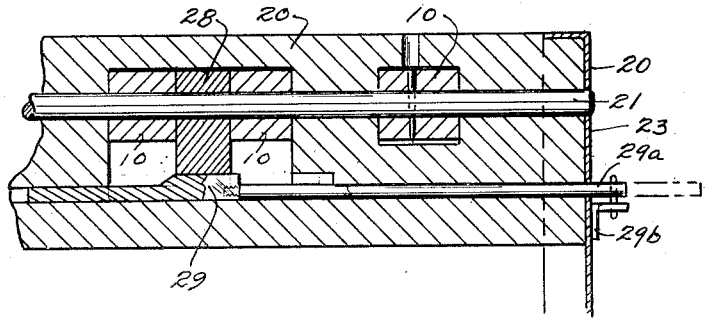
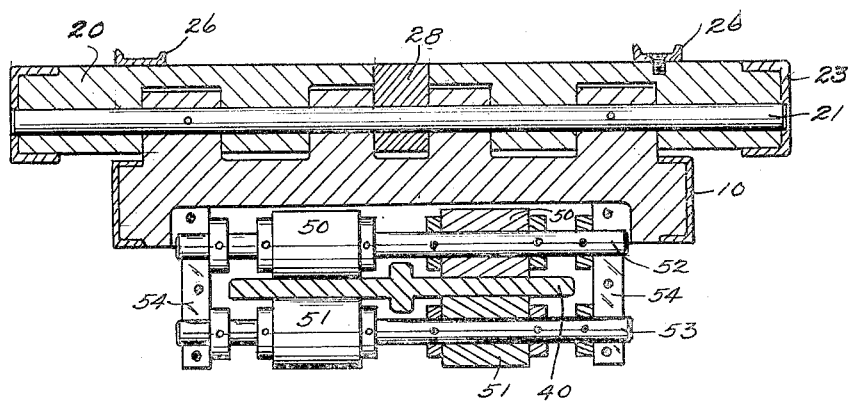
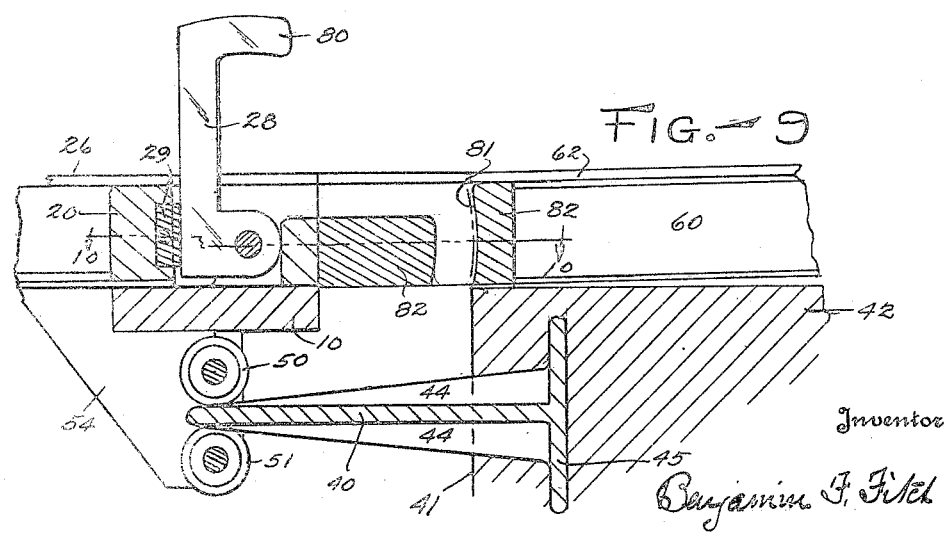

Patented Jan. 24, 1933

1,894,950

UNITED STATES PATENT OFFICE

BENJAMIN F. FITCH, OF GREENWICH, CONNECTICUT, ASSIGNOR TO MOTOR TERMINALS COMPANY, OF WILMINGTON, DELAWARE, A CORPORATION OF DELAWARE

APPARATUS FOR TRANSFERRING FREIGHT

Application filed October 23, 1929. Serial No. 401,816.

This invention relates to an apparatus for transferring freight by the employment of automobile trucks having demountable bodies which may be rolled on and off the truck frame. The general object of the invention is to provide simple and effective means for facilitating such rolling operation. More specifically, I provide on the truck frame, a trackway on which the rollers of the demountable body rest and I pivot this trackway to the frame adjacent its rear end and provide means for elevating the forward end of the trackway so that gravity may assist in rolling the body off of the truck onto an adjacent station platform. Similarly I provide the station platform with a trackway to receive the body and which may be elevated at its distant end to enable gravity to assist in rolling a body from the platform onto a truck. Finally I provide means by which the tractive effort of the truck may be employed, in one instance to tip the trackway on the truck when the body is to be rolled off the truck and in another instance to tip the trackway on the platform when the body is to be rolled onto the truck.

The above outlined features will be hereinafter more fully explained in connection with the drawings which illustrate an embodiment thereof, and the essential novel characteristics will be summarized in the claims.

In the drawings Fig. 1 is a side elevation of a truck and station platform equipped with my tipping trackways and showing the body in position after it has rolled from the station platform onto the truck platform; Fig. 2 is a similar view showing the body in the act of rolling from the truck platform onto the station platform; Fig. 3 is a sectional elevation on a larger scale of the truck body and its trackway and the associated parts on the station platform showing the truck trackway elevated; Fig. 4 is a similar view illustrating the station trackway elevated; Fig. 5 is a vertical section through the station platform lengthwise of the tipping trackway thereon; Fig. 6 is a cross section of the same in a vertical plane indicated by the line 6—6 on Fig. 5; Fig. 7 is a perspective of a stationary guide carried by the platform for causing the tipping of the platform trackway when drawn longitudinally outward; Fig. 8 is a vertical section through a rear portion of the truck and its trackway, being an enlarged section on the plane 8—8 on Fig. 3; Fig. 9 is a side elevation of the coacting leveling and locking parts caused by the platform and truck, these parts being shown on a smaller scale in Fig. 3. Fig. 10 is a section in a horizontal plane indicated by the line 10—10 on Fig. 9.

As shown in Figs. 1 and 2, 10 designates the fixed body of an automotive truck and 11 and 12 the wheels thereof, some of which are adapted to be driven by the power of the truck. The body may have a pair of longitudinal sills braced by suitable cross sills 14 as indicated in Fig. 3. Surrounding this body is a tipping frame 20 hinged at its rear end at 21 to the rear end of the truck frame. This tipping frame has longitudinal sills and cross members as 23, 24 and 25 and carries as its top surface a pair of parallel trackways 26.

Figs. 1 and 2 show at A a demountable automobile body which is a container with walls, floor, roof and suitable bracing and is provided with suitable doors indicated at $a$. This body has four or more wheels $a1$ in its floor frame which rest on the trackways 26 of the truck when the body is mounted thereon. The wheels may be flanged or the trackways flanged as desired. I prefer to make the wheels plain cylindrical members and flange the trackway, the trackway being thus an upwardly facing shallow channel bar. When the container or body is on the truck, it is positioned at its forward end by abutting a stop plate 27 on the tipping frame and is held at its rear end by suitable gate or other cross member. I have shown such rear locking gate as an arm 28 rotatably mounted on the same cross rod 21 which serves to pivot the tipping frame to the truck frame. Suitable means are provided for locking this bar in its upright position, as for instance the latch 29 slidably mounted in the tipping frame and adapted to coact with the back of the arm 28 (see Fig. 9) and prevent rotation of the arm. The latch 29 may be operated by means of a bar 29a threaded to the latch and extending through the tipping frame where it may be bent downwardly so as to be grasped by the operator and readily be thrust inwardly to lock the arm or pulled outwardly to permit the arm to swing downwardly on its pivot, thereby releasing the body. The downwardly extending portion of the bar 29a may readily be locked to a suitable projection 29b on the tipping frame by means of a suitable padlock or the like.

Pivoted to the frame 10 beneath the forward cross member 25 of the tipping frame of the truck are a pair of struts 30 carrying rollers 31 at their upper ends which preferably operate in pockets formed in the undersurface of such cross bar 25. Links 32 connect these arms 30 with levers 35 pivoted near their mid points to the truck frame adjacent its rear. The station platform is provided with a suitable bumper adapted to engage the levers 35 as the truck backs into place adjacent the platform. This action automatically swings such lever 35 and thereby pulls the links 32 and swings the arms 30 about their pivots raising the rollers 31 and thereby tipping the forward end of the frame upwardly. The result is that when the truck backs into place, adjacent the platform, the movement of the truck itself operates to tip upwardly the forward end of the body so that it may be readily rolled off of the truck.

I have shown the platform abutment referred to as comprising a cross member 40 rigidly projecting from the vertical wall 41 of the station platform 42. This bumper member may be in the nature of a horizontal web suitably braced by vertical webs indicated at 44 and having a head 45 whereby it may be effectively embedded in the material of the platform which may for instance be of cement.

I prefer to avail myself of the same bumper 40 to also bring the truck frame to a proper vertical level as the truck backs into place. To effect this, I utilize the invention shown in copending application of mine No. 321,834 filed November 26th, 1928, and comprising rollers 50 and 51 mounted on shafts 52 and 53 journalled in brackets 54 rigidly carried by the truck frame 10 and depending therefrom. Fig. 8 shows two pairs of such rollers which I find a convenient arrangement. These rollers are spaced apart a distance corresponding to the thickness of the horizontal web of the bumper 40. The bumper 40 is so arranged that when a truck carrying a maximum load, backs into place the truck will stand in a position such that the bumper 40 will engage the lower rollers 51 which will thereby ride on bottom of the web suitably lowering the truck body as it backs into place. The rollers 51 are of such diameter that if the truck carries a minimum load (where there is no container on the truck) the bumper 40 will still engage the lower rollers 51 in such a manner as to lower the truck body. Hence it is seen that when a truck which contains no container backs into position the bumper 40 will engage the rollers 51 and cause a compression of the truck springs thereby increasing the traction power of the truck over that of a truck carrying a full load and this condition will exist as long as the truck is engaged by the bumper and proves advantageous in the loading of the truck.

It will be seen therefore that when the truck backs into place, not only is it automatically lowered to bring the truck frame to the proper level, but the forward end of the tilting frame is automatically elevated to materially assist in rolling the body off of the truck. Preferably the elevation is just enough so that the body will not start to roll of its own accord, but will be readily rolled by man power.

I provide the station platform with a tippable frame having trackways adapted to register with the truck trackways and receive the wheels of the demountable bodies. Such station frame may be built up of longitudinal side rails 60, intermediate longitudinal rails 61 carrying trackways 62 and suitable cross members 63. The side members 60 carry several outwardly extending studs 65 on which are mounted rollers 66. These rollers extending into inclined openings in suitable blocks 71 secured to securing members 75 rigidly carried by the station platform 42. I have shown the blocks 71 as having flanges 73 overlying the securing blocks 75 which are embedded in the cement of the platform, screws 76 rigidly connecting the parts together.

When the tipping frame on the station platform stands with its outer end substantially flush with the vertical wall 41 of the platform as shown in Figs. 2 and 3, the tipping frame 60 is horizontal. This is the position which it occupies when the demountable body is being rolled from the truck onto the station platform. In this position each of the rollers 66 occupy the lower or rearmost portion of the inclined stationary grooves 70 which portions are all on the same level. To enable the power of the truck to tip the inner end of the station frame upwardly, I make the inclined guides 70 successively steeper as one proceeds away from the edge of the platform and I provide means whereby the truck frame may be attached to the station frame and move it longitudinally for a short distance as the truck moves away from the platform wall 42. This outward movement causes the rollers to ride up the successively steeper inclines 70 and thus tip upwardly the inner end of the frame as indicated in Fig. 5.

To lock the truck to the station frame, I may avail myself of the locking bar 28 heretofore referred to. With that in view, I provide this locking bar with a downwardly or outwardly projecting latch portion 80 which may engage in an opening 81 in a suitable block 82 in the station frame adjacent its forward end. Thus, by turning down this locking bar, I at once leave the bridgeway clear to or from the truck trackway and I lock the truck to the station platform. A short outward movement of the truck then does not change the close abutment of the station frame to the truck frame, but draws the station frame outwardly and tips its inner end upwardly so that the body thereon may be readily rolled onto the truck frame.

It will be seen that when a body loaded or unloaded is on a truck, it may be carried by the truck in the usual manner. As the truck backs into the station if the station frame is projecting beyond the edge of the platform wall 41, the truck abuts it and shoves it inwardly during the time the truck is being leveled and the forward ends of its tilting frame being lifted. Thus, irrespective of the position of the station frame at the beginning of the movement, the station frame will be in its inner and horizontal position when the truck has completed its backing movement and the forward ends of its trackways is elevated. Now, by turning down the locking bar 28, the truck becomes locked to the station frame and the demountable body may be readily and safely rolled off of the truck onto the station platform. It thus comes onto the station frame which is horizontal and may be left there for loading and unloading, or if desired, may be rolled off of the station frame onto a stationary portion of the platform by any suitable means.

To transfer a body from the station platform to the truck, this body is first placed on the tipping frame 60 when it is horizontal and hence is at its innermost position. Now the truck backs into place and the end gate 28 is hooked to the station platform frame, then the truck moves outwardly for a short distance under its own power which is readily accomplished because of the traction given the truck by reason of its engagement with the bumper as heretofore described. This outward movement of the truck drops the tipping frame of the truck to a horizontal position and elevates the inner end of the station frame. Now, the movement of the truck stops and the body may be readily rolled by manual power down the incline of the station frame and onto the trackway on the tipping frame of the truck which is now horizontal. At the conclusion of such operation, a very slight backward movement of the truck will relieve the pressure on the locking gate 28 and it may be swung into its vertical position to release the tipping platform of the station and then the locking bar 29 may be shoved into engagement with the latch 28 thereby locking it in a position to act as a tail gate for the loaded body on the truck. Thus as heretofore stated, I utilize the movement of the truck to tip the inner end of the body whether it be on the truck or platform to enable it to be readily rolled off of the truck or onto the truck as the case may be.

It may be noted that a divisional application of mine, Serial No. 491,929, filed October 29, 1930, shows and describes and claims that portion of this case which is concerned especially with the station platform and its operation by the outward movement of the truck. This parent case is concerned with the tilting platform on the truck, or with co-operative combination of tilting platforms on both the truck and the station.

I claim:—

1. An apparatus for transferring demountable bodies between a truck and a station, comprising tipable supports on both the truck and station, and means operated by the movement of the truck for tipping up that end of each support which is distant from the meeting region of the truck and station, whereby a body on the support may be readily rolled from truck to station or vice versa.

2. The combination of an automotive truck, a demountable body for the truck, a receiving station, means on the truck for tipping up the forward end of the body to assist in moving it rearwardly onto the station, and means at the station for tipping up the other end of the body to assist in moving it onto the truck, each of said means being operated by the movement of the truck.

3. The combination of a truck carrying a tilting trackway extending lengthwise of the truck frame, a station equipped with a tilting trackway adapted to align with the truck trackway, a demountable body having wheels adapted to rest on said trackway of the truck or station, and mechanism operable by the movement of the truck for raising the distant ends of the two tilting trackways whereby the body may be readily rolled in either direction to or from the truck and station.

4. The combination of a truck, a tilting platform mounted thereon, mechanism on the truck for tilting the forward portion of the platform upwardly, said mechanism having an operating member adjacent the rear end of the truck, a pair of leveling rollers carried by the truck frame, and an abutment adapted to project between said rollers and engage and operate said operating member as the truck backs toward the abutment.

5. The combination of a truck carrying a tilting support, a station having a tilting support, mechanism for raising the distant end of each tilting support, whereby a demountable truck body adapted to stand on either support may be readily moved in either direction to or from the truck and station, and means whereby said mechanism is operable by the driving movement of the truck.

6. The combination of a truck having a tilting frame, mechanism on the truck adapted to tilt the frame, a station having a tilting frame, an abutment carried by the station in position to engage the truck, mechanism on the truck automatically operated to tilt the truck frame when the truck backs against the abutment, and mechanism operated by the movement of the truck to raise the inner end of the station frame, whereby a demountable body having wheels may be readily rolled off of the truck to the station or vice versa.

7. The combination of a truck having a tilting frame extending lengthwise of the truck frame, mechanism mounted on the truck for elevating the forward end of the frame, a station equipped with a tilting frame, the truck and station frames carrying cooperating trackways, a demountable body adapted to rest on said trackways of the truck or station, and mechanism operated by the inward movement of the truck toward the platform to tip up the trackway on the truck, and mechanism operated by the outward movement of the truck from the platform to tip up the trackway at the station.

8. The combination of a truck having a tilting frame with trackways thereon, a demountable body adapted to rest on said trackways, a station platform having a movable frame with trackways thereon adapted to carry a similar body, the inner ends of each of said platforms being adapted to be elevated to assist in rolling the body off of such platform, and mechanism adapted to be operated by the movement of the truck for tipping either platform.

9. The combination of a truck having a tilting frame hinged to the truck adjacent the rear end thereof, mechanism on the truck for elevating the forward end of the frame, said mechanism having a movable operating device adjacent the rear end of the truck, a station platform, an abutment associated therewith and adapted to engage said operating mechanism to tilt the truck frame as the truck backs into place adjacent the station platform, a frame carried by the station platform and movable with reference thereto, said frame being adapted to stand horizontal and also having such connection to the platform that longitudinal outward movement of the frame will tip up the inner end thereof, and means for attaching the station frame to the truck, whereby the truck may draw said station frame outwardly, aligning tracks on the tilting frames of both the truck and platform, and a demountable body having supporting wheels adapted to rest on said tracks and be rolled from the truck frame to the platform frame or vice versa.

10. The combination of an elevated platform, a projecting abutment carried thereby, below the top of the platform, a depressed truck runway on which a power truck may back to coact with the platform adjacent the abutment, a tilting frame on the truck, and mechanism on the truck for operating the tilting frame, comprising a member projecting into position to engage the abutment by the backing movement of the truck.

11. The combination of a station platform, a truck pit adjacent one edge thereof, and at a lower level, an abutment projecting from below the station platform into the end portion of the pit, a truck adapted to back into the pit, a tilting platform pivoted at the rear end of the truck, and mechanism on the truck adapted to engage the forward end of the platform to elevate it, said mechanism comprising a movable member adjacent the rear end of the truck frame and below the platform thereon and adapted to engage said abutment.

In testimony whereof, I hereunto affix my signature.

BENJAMIN F. FITCH.